United States Patent [19]
Mizokami et al.

[11] Patent Number: 5,802,477
[45] Date of Patent: Sep. 1, 1998

[54] WIRELESS TELEPHONE APPARATUS

[75] Inventors: Hiromu Mizokami, Fukuoka; Hiroaki Ishida, Kasuga, both of Japan

[73] Assignee: Matsushita Electric Industrial Co., Ltd., Osaka, Japan

[21] Appl. No.: 590,642

[22] Filed: Jan. 24, 1996

[30] Foreign Application Priority Data

Jan. 25, 1995 [JP] Japan ................... 7-009935

[51] Int. Cl.$^6$ ................... H04M 11/00
[52] U.S. Cl. .............. 455/525; 455/435; 455/517; 455/524
[58] Field of Search ............ 379/58, 59, 60, 379/61, 62, 63; 455/33.1, 33.2, 54.1, 517, 524, 525, 435

[56] References Cited

U.S. PATENT DOCUMENTS

| | | | |
|---|---|---|---|
| 4,876,738 | 10/1989 | Selby | 455/435 |
| 5,101,500 | 3/1992 | Marui | 455/33.1 |
| 5,212,809 | 5/1993 | Oka | 455/524 |
| 5,212,822 | 5/1993 | Fukumine et al. | |
| 5,305,466 | 4/1994 | Taketsugu | 455/517 |
| 5,311,571 | 5/1994 | Pickert | 379/58 |
| 5,315,637 | 5/1994 | Breeden et al. | 379/48 |
| 5,353,331 | 10/1994 | Emery et al. | 379/58 |
| 5,509,052 | 4/1996 | Chia et al. | 379/61 |

FOREIGN PATENT DOCUMENTS

| | | |
|---|---|---|
| 0386877 | 9/1990 | European Pat. Off. |
| 0528522 | 2/1993 | European Pat. Off. |
| 0563898 | 10/1993 | European Pat. Off. |
| 0616457 | 9/1994 | European Pat. Off. |
| 060291718 | 10/1994 | Japan. |
| 2245126 | 12/1991 | United Kingdom. |
| 2271917 | 4/1994 | United Kingdom. |
| 2289828 | 11/1995 | United Kingdom. |

*Primary Examiner*—Curtis A. Kuntz
*Assistant Examiner*—Binh K. Tieu
*Attorney, Agent, or Firm*—McDermott, Will & Emery

[57] ABSTRACT

In a wireless telephone apparatus composed of a base station connected to a public switched telephone network and a personal station which can communicate by wireless with the base station, an area which the personal station can communicate with is expanded by making the personal station to be registered in a plurality of base stations. The personal station includes a wireless part for communicate by wireless with the base station, a base station ID number registration part for registering ID numbers of a plurality of base stations and a control part for reading an ID number of a base station to be called from the base station ID number registration part and controlling the wireless part to establish a communication by wireless with the base station according to the read ID number of the base station.

17 Claims, 11 Drawing Sheets

5,802,477

WIRELESS TELEPHONE APPARATUS

BACKGROUND OF THE INVENTION

The present invention relates to a wireless telephone apparatus, especially to a cordless telephone apparatus.

Lately, a cordless telephone apparatus using wireless instead of a cord between a telephone apparatus itself and a hand set has been widely used.

A wireless telephone apparatus in accordance with the prior art is described below, referring to drawings.

FIGS. 3 and 4 are sequence charts showing a calling procedure and a call-receiving procedure, respectively in a wireless telephone apparatus in accordance with the prior art.

FIG. 1 is a block diagram of a base station of a wireless telephone apparatus in accordance with the prior art.

The block 1 is a base station of a wireless telephone apparatus. The block 2 is a microphone, the block 3 is a speaker, the block 4 is a key input part and the block 5 is an antenna. The block 6 is a a wireless part for receiving a high frequency signal from a personal station 12 of a wireless telephone apparatus described later, reproducing a sound signal or a message data signal and transmitting a sound signal or a message data signal as a modulated high frequency signal. The block 7 is a sound processing part for adjusting signal levels of a sound signal and a message data signal outputted from wireless part 6, outputting them to a network interface part 8 described later and speaker 3 and outputting signals from network interface part 8 and microphone 2 to speaker 3 and wireless part 6. The block 8 is a network interface part which is connected to a public switched telephone network and communicates through the public switched telephone network. The block 9 is a personal station ID (identification) number registration part for storing a registered ID number of a personal station and an ID number of the personal station 12 of a wireless telephone apparatus described later is registered in it. The block 10 is an own ID number registration part for storing an ID number of the base station 1 itself. The block 11 is a central control part for controlling the entire base station 1.

FIG. 2 is a block diagram of a personal station of a wireless telephone apparatus in accordance with the prior art.

The block 12 is a personal station of a wireless telephone apparatus. The block 13 is a microphone, the block 14 is a speaker, the block 15 is a key input part and the block 16 is an antenna. The block 17 is a wireless part for receiving a high frequency signal from a base station 1, reproducing a sound signal or a message data signal and modulating them to transmit a sound signal or a message data signal as a modulated high frequency signal. The block 18 is a sound processing part for adjusting signal levels of microphone 13 and a sound signal from base station 1, outputting them to speaker 14 and wireless part 17. The block 19 is a base station ID number registration part storing a registered ID number 19a of base station 1. The block 20 is an own ID number registration part storing an ID number 20a of personal station 12 itself. The block 21 is a central control part controlling the entire personal station 12.

FIGS. 3 and 4 are sequence charts showing a calling procedure and a call-receiving procedure, respectively in a wireless telephone apparatus in accordance with the prior art.

A case in which a personal station 12 calls is explained below, referring to FIG. 3.

When a user of personal station 12 makes a call operation, that is off-hook, using key input part 15 (Step 1), central control part 21 of personal station 12 makes a data string of a traffic confirmation request containing base station ID number 19a stored in base station ID number registration part 19 and own ID number 20a stored in own ID number registration part 20 (Step 2) and commands wireless part 17 to transmit.

Wireless part 17 of personal station 12 which received a transmission command modulates a data string received from central control part 21 and transmits a modulated high frequency signal to base station 1 through antenna 16 (Step 3).

When wireless part 6 of base station 1 receives the traffic channel confirmation request message through antenna 5, wireless part 6 converts the received high frequency signal into a data string and transmits it to central control part 11. Central control part 11 receives the data string decodes the data string and after confirming that the received base station ID number is coincident with an ID number stored in own ID number registration part 10, checks what kind of message is included in the data string and confirms that the message is a traffic channel confirmation request message (Step 4). Then, central control part 11 makes a data string of traffic channel allocation including the ID number stored in own ID number registration part 10 and a personal station ID number of personal station 12 which has transmitted a traffic channel confirmation request message to transmit a traffic channel allocation message to personal station 12 which has transmitted the traffic channel confirmation request message (Step 5) and commands wireless part 6 to transmit. Wireless part 6 which has received the transmission command modulates the data string received from central control part 11 and transmits the modulated high frequency to personal station 12 through antenna 5 (Step 6).

The high frequency signal transmitted from base station 1 is received at wireless part 17 of personal station 12 through antenna 16.

Then, wireless part 17 converts the received high frequency signal into a data string and supplies the data string to central control part 21. Central control part 21 which has received the data string decodes the data string and after confirming that the base station ID number included in the decoded data string is coincident with the base station ID number 19a stored in base station ID number registration part 19 and the personal station ID number included in the decoded data string is coincident with own ID number 20a stored in own ID number registration part 20, checks what kind of message is included in the data string and confirms that the message is a traffic channel allocation message (Step 7).

Then, base station 1 and personal station 12 confirm a traffic channel for each other, with the base station 1 and the personal station 12 transferring to the channel designated by the traffic channel allocation message (Step 8).

Personal station 12 transmits a message indicating to transmit the ID number to be called to base station 1 (setup request message), using the confirmed traffic channel (Step 9). According to this message, a message indicating to have confirmed the setup message (a setup acknowledge message) is transmitted from base station 1 (Step 10).

After this setup acknowledge message, central control part 11 of base station 1 catches a public switched telephone network by controlling network interface part 8 (Step 11) and receives a DT (dial tone) signal coming from the caught public switched telephone network through network interface part 8 and transmits it to personal station 12 by controlling wireless part 6 (Step 12).

When a dial signal is outputted from key input part 15 of personal station 12 (Step 13), central control part 21 transmits a dial request message by controlling wireless part 17 (Step 14).

Then, when wireless part 6 of base station 1 receives the message, central control part 11 outputs a coded signal corresponding to a dialing input to the public switched telephone network by controlling network interface part 8 according to the dial request message (Step 15).

Similar performances are repeated (Steps 17 and 18) every time a dial signal is outputted from key input part 15 of personal station 12 (Step 16).

When dialing is finished and calling is commenced, a ring back tone (RBT) is outputted from the public switched telephone network. When network interface part 8 of base station 1 receives the RBT, the received signal is adjusted with its volume at sound processing part 7, is modulated at wireless part 6 and radiated from antenna 5. When antenna 16 of personal station 12 receives this signal, the signal is demodulated at wireless part 17, is converted into an analog signal at sound processing part 18 and is outputted from speaker 14.

When the receiver to be called makes an off-hook, a line reverse signal comes from the public switched telephone network to network interface part 6 (Step 19).

Detecting the line reverse signal coming, central control part 11 controls wireless part 6 to transmit a connect message (Step 20).

When wireless part 17 of personal station 12 receives the transmitted signal, central control part 21 of personal station 12 detects that the receiver side has received a call and thereafter connects to the receiver through the base station and a communication begins.

A case in which a personal station 12 receives a call is explained below, referring to FIG. 4.

When receiving a call through the public switched telephone network (Step 101), network interface part B detects the incoming call and informs the central control part 11 about the detected incoming call (Step 102). Central control part 11, informed about the detection of the incoming call makes a data string of an incoming call indication message including an ID number stored in own ID number registration part 10 (Step 103) and commands wireless part 6 to transmit. Wireless part 6 commanded to transmit modulates the data string supplied from central control part 11 and transmits the modulated high frequency signal to personal station 12 through antenna 5 (Step 104).

This signal is received at wireless part 17 through antenna 16 of personal station 12. Wireless part 17 converts the received high frequency signal into a data string and supplies the data string to central control part 21. Central control part 21 decodes the data string and checks what kind of message is contained in the data string after confirming that the ID number contained in the data string is coincident with the base station ID number 19a stored in base station ID number registration part 19. Confirming that the message is a incoming call indication signal (Step 105), a traffic channel is confirmed in the similar procedure to steps 2 to 8 and both the base station and the personal station transfer to the channels designated by a traffic channel allocation message of the base station (Steps 106 to 111).

Then, central control part 21 of personal station 12 controls wireless part 17 to transmit a connect message indicating that a traffic route was made (Step 112). When wireless part 6 of base station 1 receives this message, central control part 11 controls wireless part 6 to transmit a setup request message indicating that the communication is going to start from now (Step 113). When wireless part 17 of personal station 12 receives this message, central control part 21 controls wireless part 17 to transmit a setup acknowledge message indicating that the request message was accepted (Step 114).

When wireless part 6 of base station 1 receives this message, central control part 11 controls wireless part 6 to transmit a call message (Step 115).

When wireless part 17 of personal station 12 receives this message, central control part 21 controls sound processing part 18 to utter a calling sound from speaker 14 (Step 116).

When the user of personal station 12 makes an off-hook procedure at key input part 4 (Step 117), central control part 21 controls wireless part 17 to transmit a connect message (Step 118).

When wireless part 6 of base station 1 receives this message, central control part 11 controls network interface part 8 to output a message indicating that off-hook was made for the public switched telephone network (Step 119) and controls wireless part 6 to transmit a connect acknowledge message indicating that the connect message was accepted (Step 120).

A communication between a personal station 12 and another personal station is commenced through the base station 1 (Step 121).

Thus, only one base station is set for the personal station in a wireless telephone apparatus and because the personal station can communicate only in the communication range of its base station, the communication area is small. This is a problem.

SUMMARY OF THE INVENTION

The present invention solves the above problem and aims to present a wireless telephone apparatus which can expand the usable area of a personal station.

To achieve this object, a personal station of a wireless telephone apparatus of the present invention includes a registration part of base station information in which an information about a plurality of base stations is registered; and a control part to read an information about a base station to be called from the registration part of base station information and to control a wireless part to confirm a wireless communication between the base station and own station according to a base station information which was read from the registration part of base station information.

According to the present invention, a personal station can communicate without being restricted by a communication area of one base station, because a personal station can communicate by selecting any one of a plurality of base stations.

DESCRIPTION OF THE PREFERRED EMBODIMENT

Figure 1:
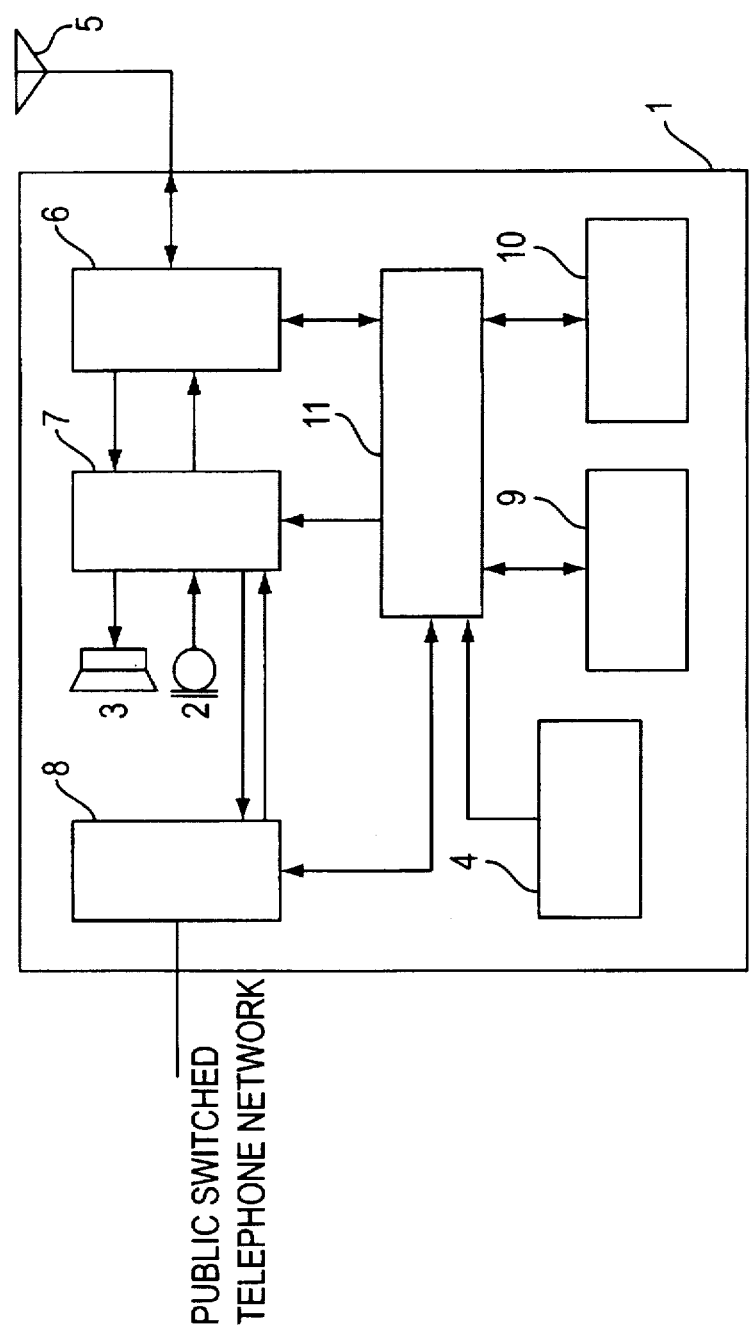
FIG. 1 is a block diagram of a base station of a wireless telephone apparatus in accordance with the prior art.
Figure 2:
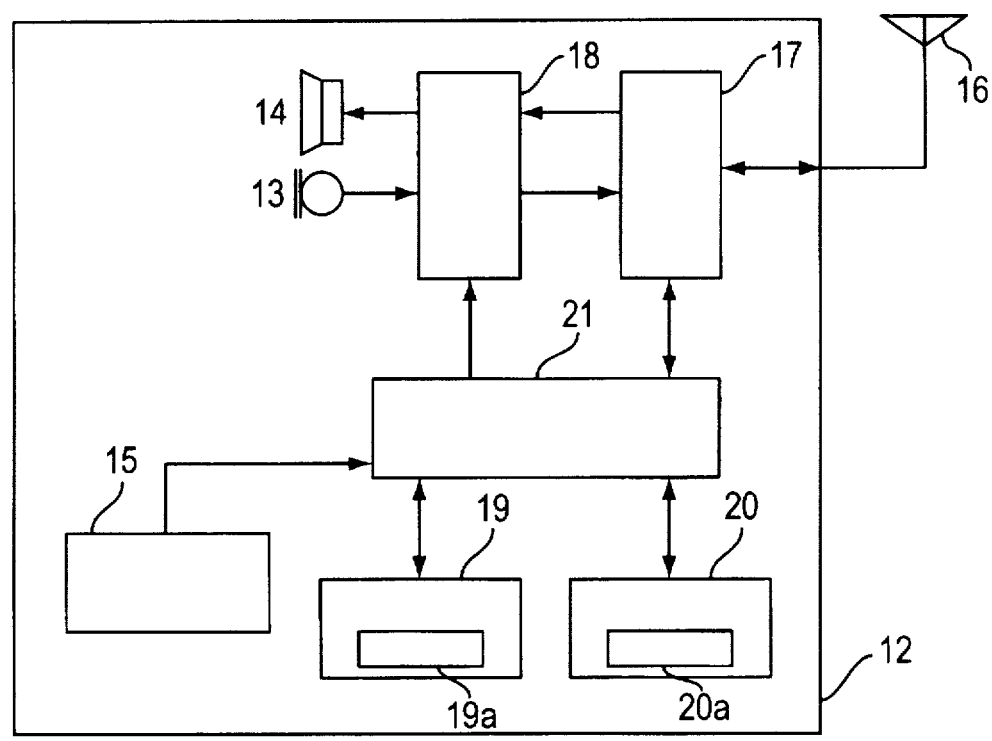
FIG. 2 is a block diagram of a personal station of a wireless telephone apparatus in accordance with the prior art.
Figure 3:
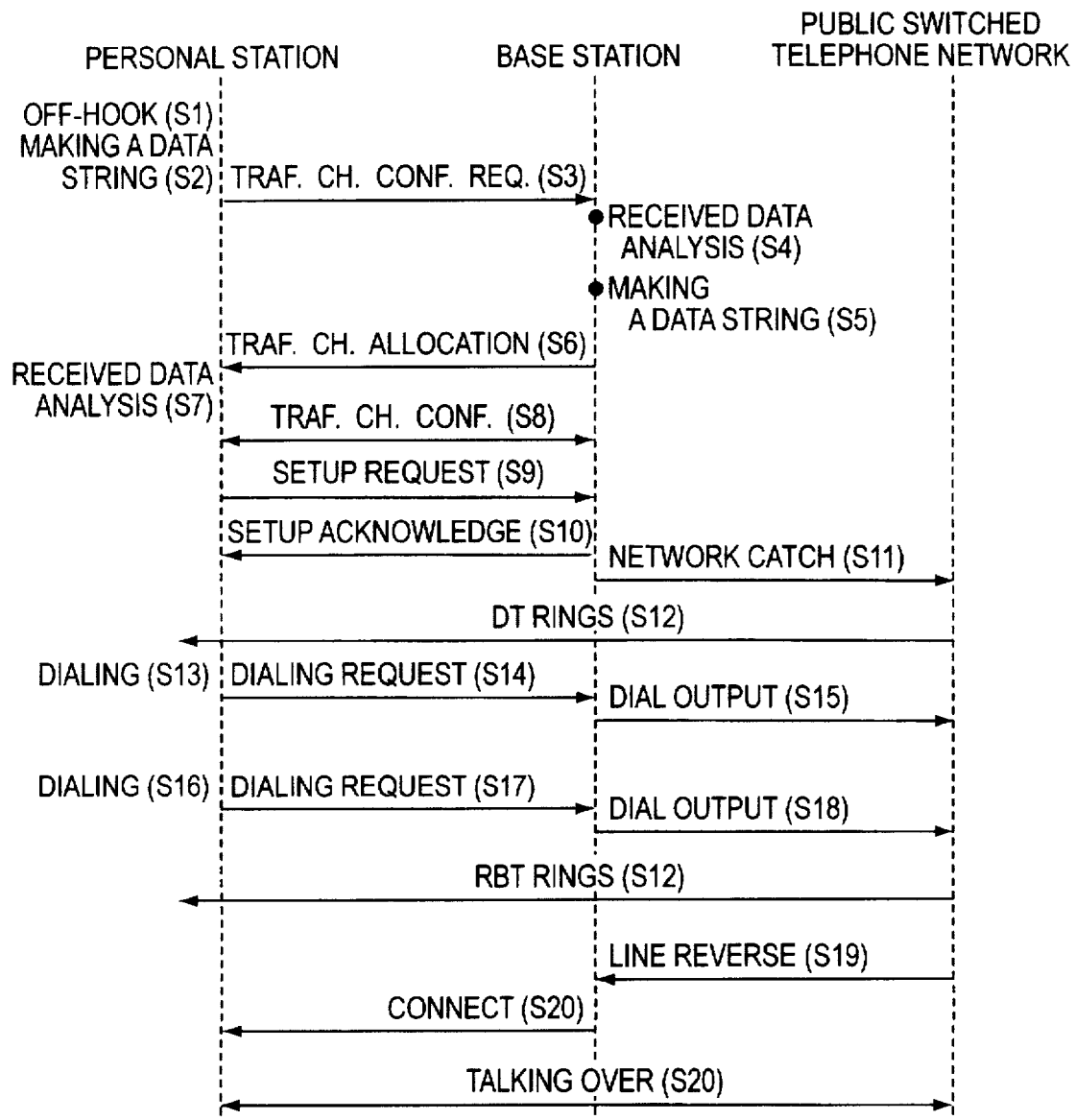
FIG. 3 is a sequence chart showing a calling procedure in a wireless telephone apparatus in accordance with the prior art.
Figure 4:
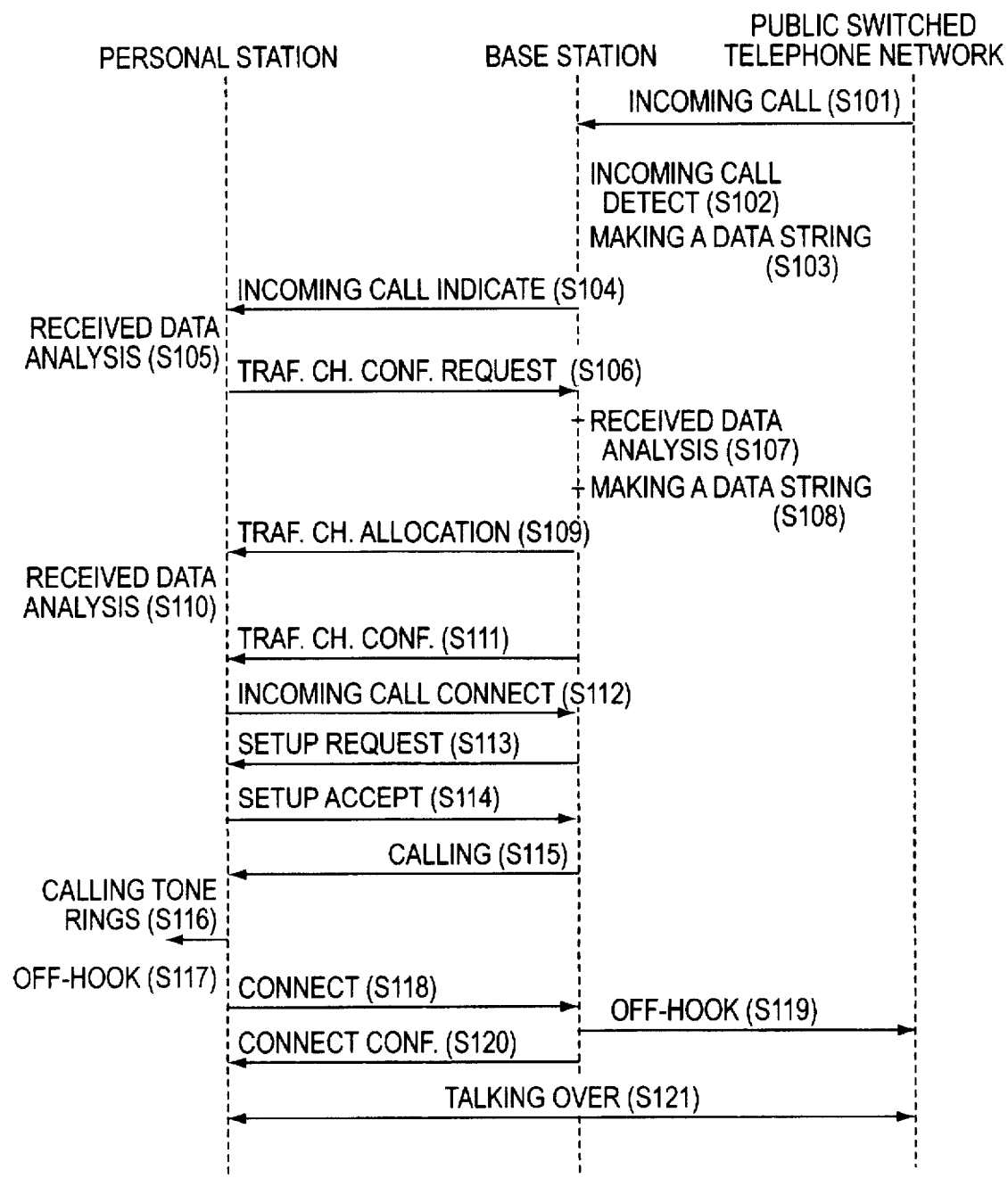
FIG. 4 is a sequence chart showing a call-receiving procedure in a wireless telephone apparatus in accordance with the prior art.
Figure 5:
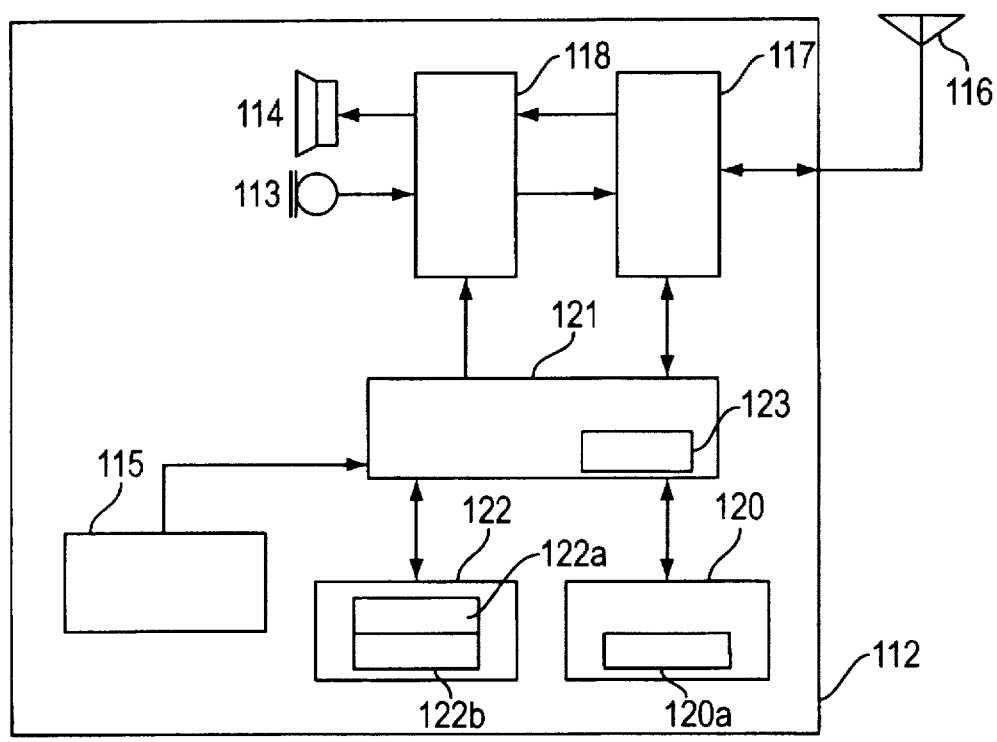
FIG. 5 is a block diagram of a personal station of a wireless telephone apparatus in accordance with an exemplary embodiment of the present invention.

FIG. 5 is a block diagram of a personal station of a wireless telephone apparatus in accordance with an exemplary embodiment of the present invention.

The block 112 is a personal station of a wireless telephone apparatus. The block 113 is a microphone, the block 114 is a speaker, the block 115 is a key input part and the block 116 is an antenna. The block 117 is a wireless part for receiving a high frequency signal from a base station 101 described later, reproducing a sound signal or a message data signal and modulating them and transmitting a sound signal or a message data signal as a modulated high frequency signal. The block 118 is a sound processing part for adjusting signal levels of microphone 113 and a sound signal, supplying them to wireless part 117, adjusting a level of a sound signal transmitted from base station 101 and demodulated at wireless part 117 and outputting them to speaker 114. The block 122 is a base station ID number registration part for storing registered ID numbers 122a and 122b of a plurality of base stations 101 and in this exemplary embodiment, two ID numbers can be stored for two base stations.

The block 120 is an own ID number registration part for storing an ID number 120a of personal station 112 itself. The block 121 is a central control part for controlling an entire personal station 112 and has a communicating base station memory part 123 to store the ID number of the communicating base station.

Figure 6:
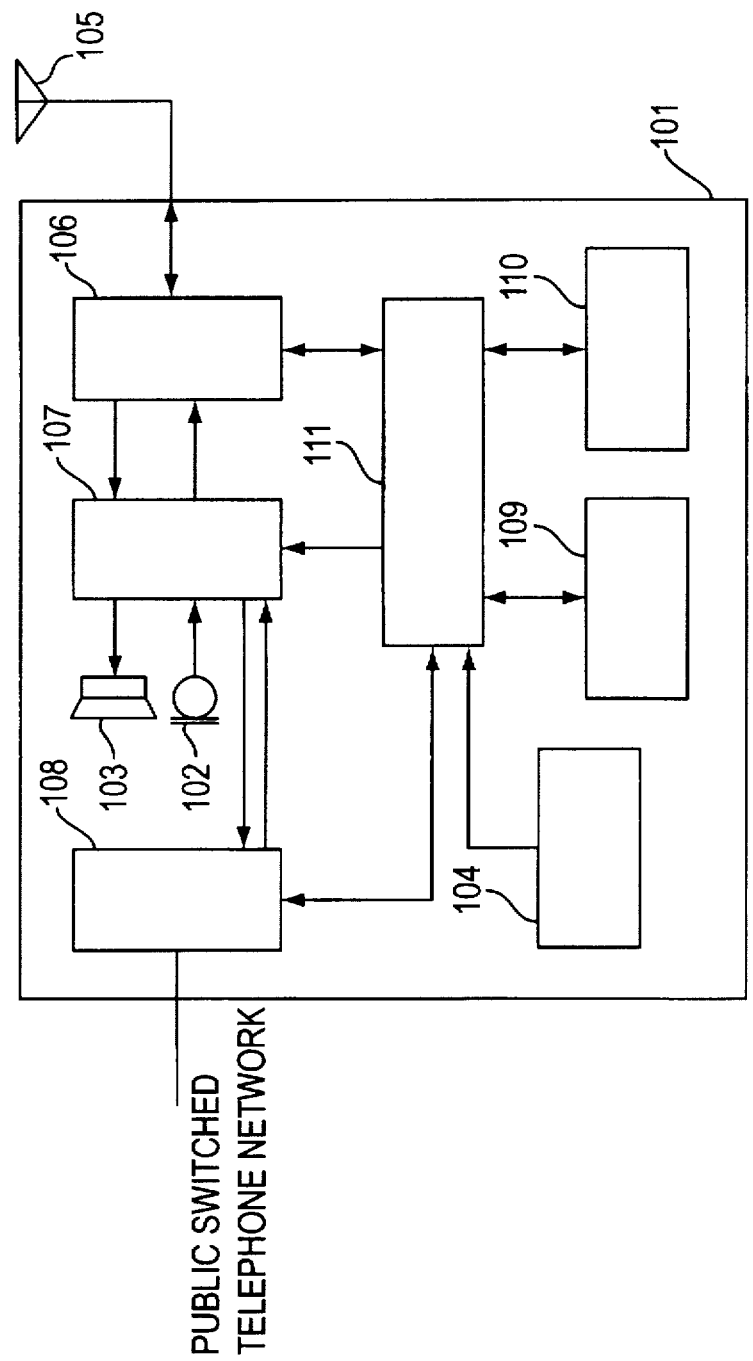
FIG. 6 is a block diagram of a base station of a wireless telephone apparatus in accordance with an exemplary embodiment of the present invention.

FIG. 6 is a block diagram of a base station of a wireless telephone apparatus in accordance with an exemplary embodiment of the present invention.

The block 101 is a base station of a wireless telephone apparatus. The block 102 is a microphone, the block 103 is a speaker, the block 104 is a key input part and the block 105 is an antenna. The block 106 is a a wireless part for receiving a high frequency signal from a personal station 112, demodulating a sound signal or a message data signal and modulating a sound signal or a message data signal to transmit a sound signal or a message data signal as a modulated high frequency signal to personal station 112. The block 107 is a sound processing part for adjusting signal levels of a sound signal and a message data signal outputted from microphone 102 or wireless part 106, outputting them to a network interface part 108 described later and speaker 103 and to the contrary, outputting signals from network interface part 108 and microphone 102 to speaker 103 and wireless part 106. The block 108 is a network interface part which is connected to a public switched telephone network and communicates through the public switched telephone network. The block 109 is a personal station ID number registration part for storing a registered ID number of a personal station 112. The block 110 is an own ID number registration part for storing an ID number of the base station 101 itself. The block 111 is a central control part for controlling an entire base station 101.

In the exemplary embodiment, it is assumed that there are two base stations with the same content and they are placed so that each communication area does not overlap and are denoted as 101A and 101B.

About a wireless telephone apparatus described above, its performance is explained below.

Figure 7:
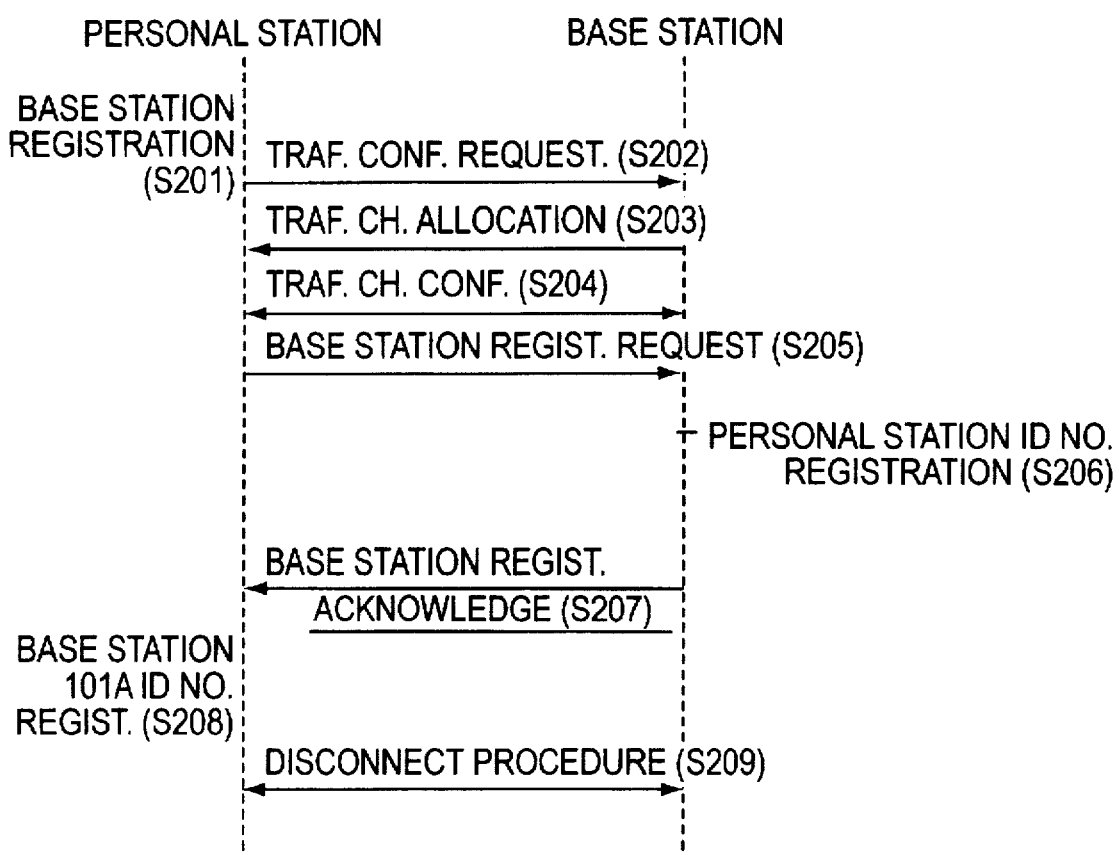
FIG. 7 is a sequence chart showing how to register ID numbers of the base stations A and B in a personal station at a wireless telephone apparatus in accordance with an exemplary embodiment of the present invention.

First, how to register ID numbers of base stations 101A and 101B in personal station 112 is described below, referring to FIG. 7.

The user of personal station 112 moves to the inside of the communication area of base station 101A. A user of personal station 112 pushes the keys of key input part 115 for registering its location (Step 201). Central control part 121 of personal station 112 makes a data string for traffic channel confirmation request including own ID number 120a stored in own ID number registration part 120 and commands wireless part 117 to transmit it.

Wireless part 117 of personal station 112 commanded to transmit modulates the data string coming from central control part 121 and transmits to base station 101A through antenna 116 as a high frequency signal (Step 202).

Receiving the traffic channel confirmation request message through antenna 105, wireless part 106 of base station 101 converts the received high frequency signal into a data string and supplies it to central control part 111.

Central control part 111 which has received the data string decodes the data string, checks what kind of message is written in an additional information area and confirms that the message is a traffic channel confirmation request message.

Being confirmed that the message is a traffic channel confirmation request message, central control part 111 temporarily stores a personal station ID number included in the data string.

Further, central control part 111 makes a data string indicating traffic channel allocation including personal station ID number of personal station 112 which has transmitted an ID number stored in own ID number registration part 110 and a traffic channel confirmation request message and commands wireless part 106 to transmit the data string. Wireless part 106 commanded to transmit modulates the data string received from central control part 111 and transmits it to personal station 112 through antenna 105 as a high frequency signal (Step 203).

The high frequency signal transmitted from base station 101A is received at wireless part 117 of personal station 112 through antenna 116.

Wireless part 117 converts the received high frequency signal into a data string and supplies the data string to central control part 121. Central control part 121 decodes the data string, confirms that the personal station ID number included in the decoded data string is coincident with own ID number 120a stored in own ID number registration part 120, checks what kind of message is included in the data string and confirms that the message is a traffic channel allocation message.

Central control part 121 temporarily stores the ID number of base station 101A.

Both base station 101A and personal station 112 transfer to a channel designated by base station 101A through the traffic channel allocation message and the traffic channel is confirmed (Step 204).

When the traffic channel is confirmed, central control part 123 of personal station 112 controls wireless part 117 to transmit a base station registration request message (Step 205).

When wireless part 106 of base station 101A receives this signal, central control part 111 makes personal station ID number registration part 109 register the ID number of personal station 112 temporarily stored (Step 206) and controls wireless part 106 to transmit a base station registration acknowledge message indicating that base station 101 accepted a registration (Step 207).

When wireless part 117 of personal station 112 receives this message, central control part 121 registers the ID number of base station 101A in base station registration part 122 (Step 208).

Then, a disconnect procedure between base station 101A and personal station 112 is executed and a registration procedure of base station is finished (Step 209).

Similarly, when personal station 112 is moved to the inside of the communication area of base station 101B and registration procedure is executed, the ID number of base station 101B is also registered in base station ID number registration part 122 of personal station 112.

Next, a procedure to determine which base station the personal station 121 is connected to 101A or to 101B is explained below, referring to a flow chart shown in FIG. 8.

Central control part 121 of personal station 112 checks that a selection procedure of base station was executed in key input part 115 (Step 301).

If the selection procedure of base station is not executed yet, step 301 is repeated after the other processes are executed (Step 306).

When it is judged that the selection procedure of base station was executed at key input part 115 at step 301, then central control part 121 judges if a procedure to select base station 101A was executed at key input part 115 (Step 302).

In this case, if a procedure to select base station 101A is executed, an information that base station 101A is used is stored in communicating base station memory part 123 in central control part 121 (Step 303) and the following procedure is executed (Step 306).

When a procedure to select base station 101A was not executed at step 303, if a procedure to select base station 101B was executed at key input part 115 is judged (Step 304).

In this case, if a procedure to select base station 101B is executed, information that base station 101B is used is stored in communicating base station memory part 123 in central control part 121 (Step 305) and the following procedure is executed (Step 306).

If a procedure to select base station 101B is not executed at step 304, the procedure returns to step 302.

Thus, a base station to be connected to the personal station 112 is selected.

According to the above procedure, a calling procedure in the case in which base station 101A is selected, that is in the case in which an information that base station 101A is used is stored in communicating base station memory part 123 is described below, referring to FIG. 9.

When a calling procedure, that is off-hook is made by a user of personal station 112 using key input part 115 in the communication area of base station 101A (Step 401), central control part 121 of personal station 112 refers to communicating base station memory part 123 and judges which the base station being selected is 101A or 101B. In this case, because an information that base station 101A is used is stored in communicating base station memory part 123, it is judged that base station 101A is selected.

According to this judgment, central control part 121 reads ID number 122a of base station 101A from base station ID number registration part 122, reads the own ID number 120a stored in own ID number registration part 120 of personal station 112, makes a data string of traffic channel confirmation request message including these read ID numbers (Step 402) and commands wireless part 117 to transmit.

Wireless part 117 of personal station 112 commanded to transmit modulates the data string supplied from central control part 121 and transmits to base station 101A through antenna 116 as a high frequency signal (Step 403).

When wireless part 106 of base-station 101A receives the traffic channel confirmation request message through antenna 105, wireless part 106 converts this message into a data string and supplies to central control part 111. Central control part 111 supplied with the data string decodes the data string, confirms that the received base station ID number is coincident with the ID number stored in own ID number registration part 110 and checks what kind of message is included in the data string. When central control part 111 confirms that the message is a traffic channel confirmation request message (Step 404), central control part 111 makes a data string indicating a traffic channel allocation including the ID number stored in own ID number registration part 110 and the ID number of personal station 112 which has transmitted the traffic channel confirmation request message (Step 405) and commands wireless part 106 to transmit. Wireless part 106 commanded to transmit modulates the data string supplied from central control part 111 and transmits to personal station 112 as a high frequency signal through antenna 105 (Step 406).

The traffic channel allocation message transmitted from base station 101A is received at wireless part 117 of personal station 112 through antenna 116.

Wireless part 117 converts the received message onto a data string and supplies the data string to central control part 121. Central control part 121 which has received the data string decodes the data string, confirms that the base station ID number included in the decoded data string is coincident with The ID number 122a of base station 101A stored in base station ID number registration part 122 and personal station ID number included in the decoded data string is coincident with own ID number 120a stored in own ID number registration part 120, checks what kind of message is included in the data string and confirms that the message is a traffic channel allocation message (Step 407).

Both base station 101A and personal station 112 transfer to the channel designated by a traffic channel allocation message from base station 101A. Thus, the traffic channel was confirmed (Step 408).

When personal station 112 transmits a setup request message to transmit a telephone number of a person to be called to its base station through this confirmed traffic channel (Step 409), corresponding to this message, a setup acknowledge message indicating that the setup acknowledge message was confirmed is coming from base station 101A (Step 410).

After the giving and accepting (transmitting and receiving) of the messages, base station 101A controls network interface part 108 to catch the public switched telephone network (Step 411) and supplies a DT (dial tone) signal coming from the caught telephone network to personal station 112 (Step 412).

Being given a dial input at key input part 115 of personal station 112 (Step 413), central control part 121 controls wireless part 117 to transmit a dialing request message (Step 414).

When wireless part 106 of base station 101 receives this message, central control part 111 controls network interface part 108 to output a dialing message corresponding to the dialing request message to the public switched telephone network (Step 415). After that, every time a dial input is given at key input part 115 of personal station 112 (Step 416), a similar performance is made (Steps 417 and 418).

Finishing dial inputting and commencing calling a receiver to be communicated, the public switched telephone network outputs RBT (ring back tone) message. When the RBT message is received at network interface part 108 of base station 101A, the RBT message is supplied to wireless part 106 through sound processing part 107, is modulated at wireless part 106 and then is radiated from antenna 105. When antenna 116 of personal station 112 receives this message signal, the signal is demodulated at wireless part 117, is converted into an analog signal at sound processing part 118 and is outputted from speaker 114.

When the receiver to be called makes an off-hook action, a line reverse signal comes from the public switched telephone network to network interface part 106 of base station 101A (Step 419).

Detecting the signal coming, central control part 111 controls wireless part 106 to transmit a connect message (Step 420).

Receiving the connect message at wireless part 117 of personal station 112, central control part 121 of personal station 112 detects that the receiver to be called received a call, connects to the receiver to be called through base station 101A and a communication is commenced.

Figure 10:
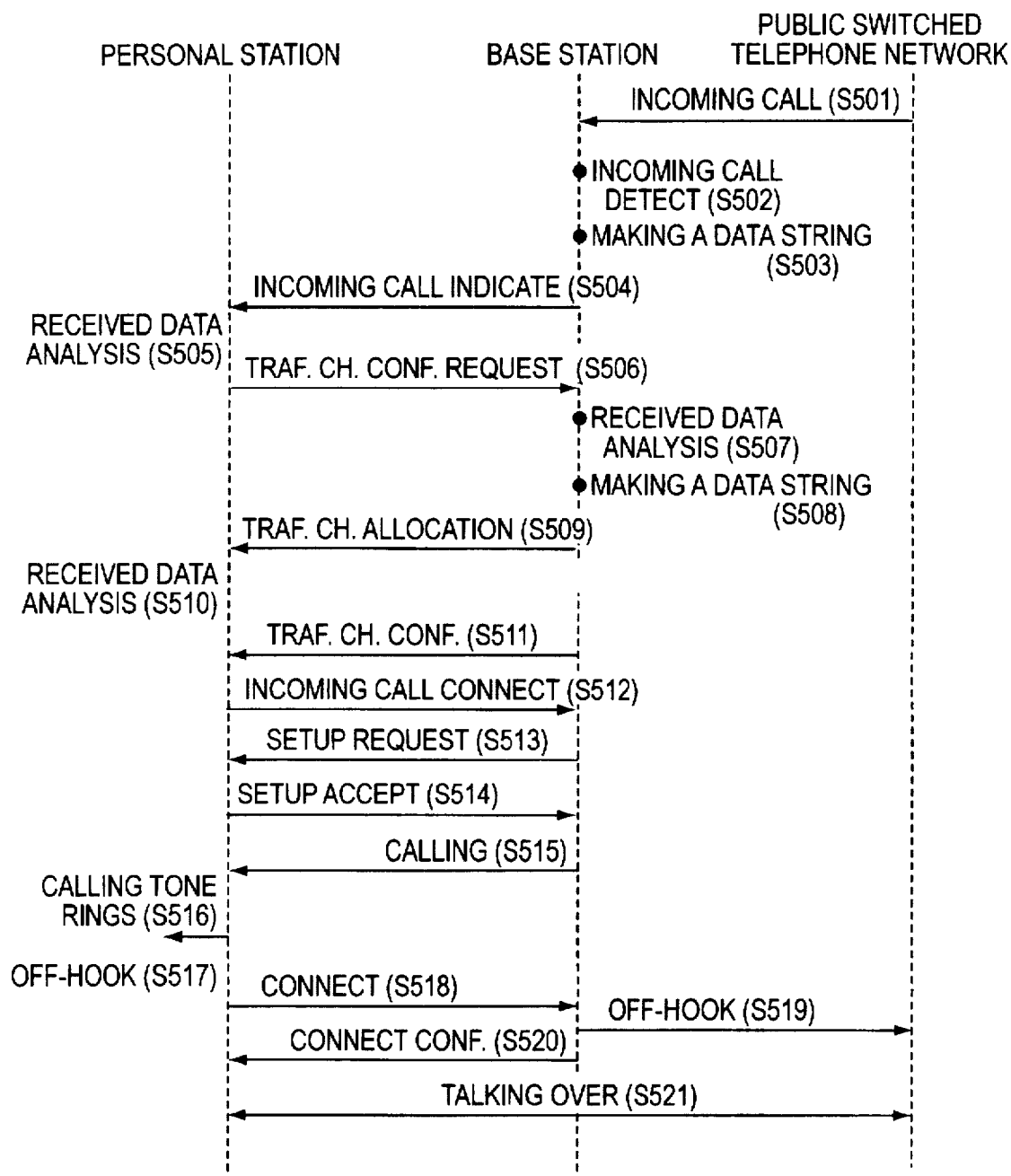
FIG. 10 is a sequence chart showing a performance in the case in which a personal station A receives a call from a base station, at a wireless telephone apparatus in accordance with an exemplary embodiment of the present invention.

A performance in the case in which a call message comes from base station 101A to personal station 112, referring to a sequence chart shown in FIG. 10.

When a call comes from personal station 112 to base station 101A through the public switched telephone network (Step 501), network interface part 108 of base station 101A detects an incoming call and informs to central control part 111 (Step 502). Central control part 111 informed the detection of incoming call makes a data string of incoming call display message including an ID number stored in own ID number registration part 110 (Step 503) and commands wireless part 106 to transmit. Wireless part 106 commanded to transmit modulates the data string supplied from central control part 111 and transmits to personal station 112 as a high frequency signal through antenna 105 (Step 504).

This signal is received at wireless part 117 through antenna 116 of personal station 112. Wireless part 117 converts the received high frequency signal into a data string and supplies to central control part 121.

Central control part 121 received the data string judges which base station is used in communicating base station memory part 123 101A or 101B. In the exemplary embodiment, because an information that base station 101A is used is stored in communicating base station memory part 123, it comes to be judged that base station 101A is used.

Central control part 121 decodes the data string supplied from wireless part 117 and reads the ID number 122a of base station 101A selected at the previous judgment from base station ID number registration part 122. After confirming that the base station ID number included in the data string is coincident with the ID number 122a of base station 101A stored in base station ID number registration part 122 and further confirming it is a message to be checked at personal station side, central control part 121 checks what kind of message is included in the data string and confirms that the message is a incoming call indication message (Step 505). After this confirmation, a traffic channel is set up in a similar procedure to steps 402 to 408 shown in FIG. 9 and both base station and personal station transfer to the channel designated by a traffic channel allocation message from base station 101A (Steps 506 to 511).

After that, central control part 121 of personal station 112 controls wireless part 117 to transmit an incoming call connect message indicating that personal station 112 accepted the incoming call (Step 512). When wireless part 106 of base station 101A receives the message, central control part 111 controls wireless part 106 to transmit a setup request message indicating a communication is now going to start (Step 513). Wireless part 117 of personal station 112 received the request message is supplied with a setup acknowledge message indicating that the request message was accepted from central control part 121 (Step 514).

When wireless part 106 of base station 101A receives the message, central control part 111 controls wireless part 106 to output a calling message (Step 515).

When wireless part 117 of personal station 112 receives the message, central control part 121 controls sound processing part 118 to utter a calling tone from speaker 114 (Step 516).

Then, when the user of personal station 112 makes an off-hook procedure at key input part 115 (Step 517), central control part 121 controls wireless part 117 to transmit a connect message (Step 518).

When wireless part 106 of base station 101A receives this message, central control part 111 controls network interface part 108 to transmit a message that there was an off-hook to the public switched telephone network (Step 519) and controls wireless part 106 to transmit a connect acknowledge message indicating that the connect message was received (Step 520).

Thus, a communication between personal station 112 and the other personal station is commenced through base station 101A (Step 521).

Figure 8:
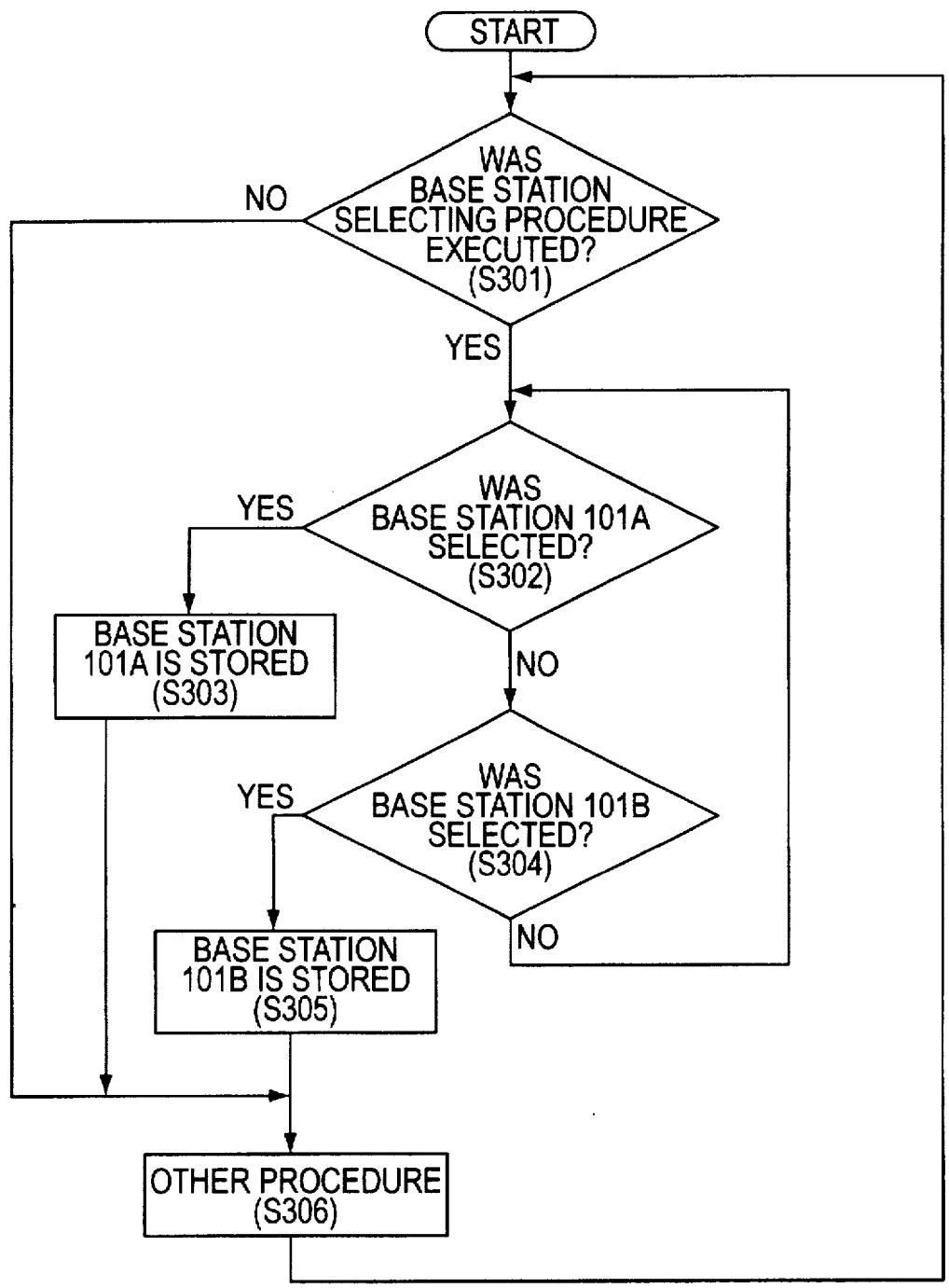
FIG. 8 is a flow chart showing a procedure to determine which base station A or B the personal station communicates to, at a wireless telephone apparatus in accordance with an exemplary embodiment of the present invention.
Figure 9:
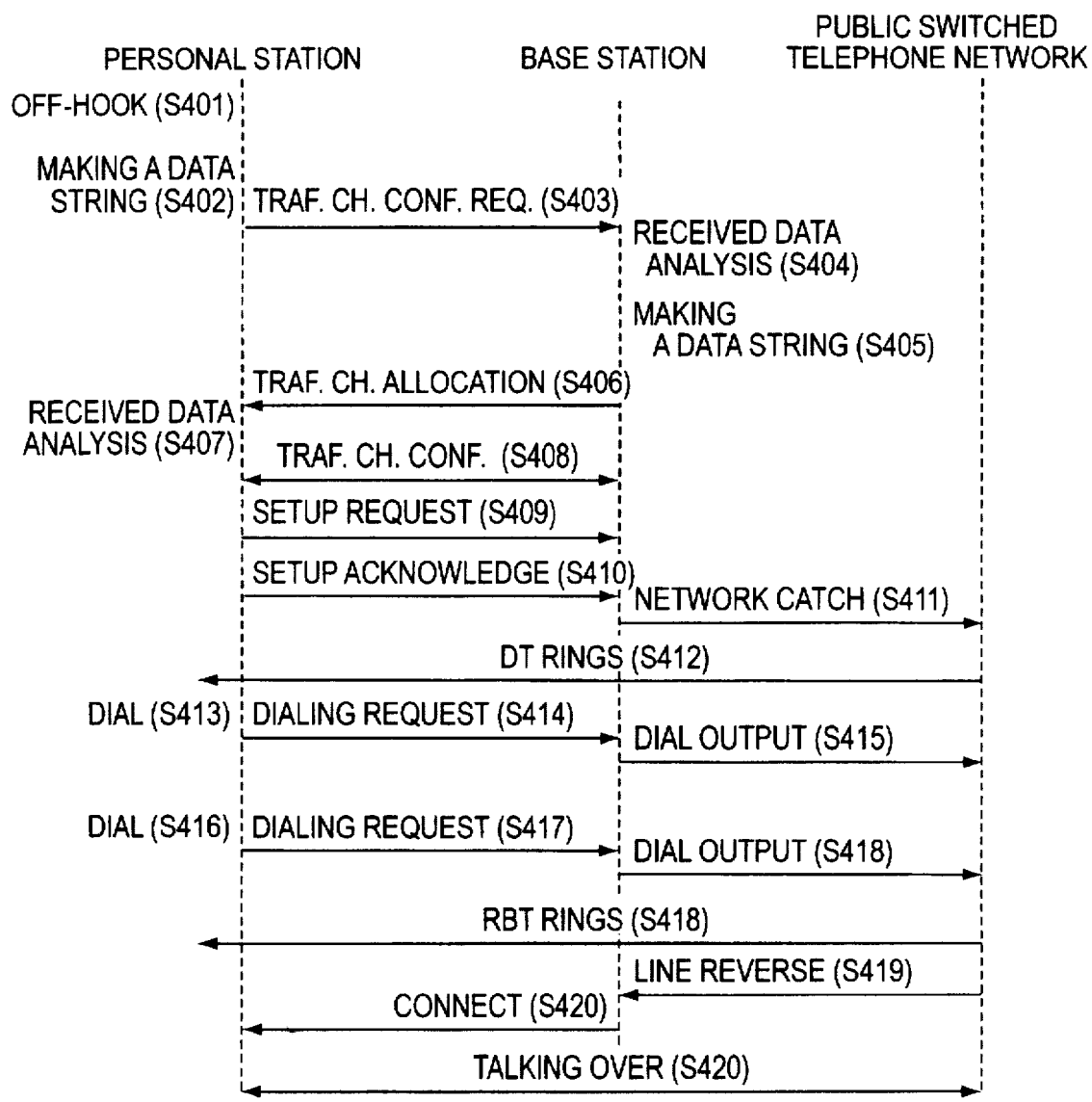
FIG. 9 is a sequence chart showing a calling procedure in the case in which a base station A is selected, at a wireless telephone apparatus in accordance with an exemplary embodiment of the present invention.

The performances of calling and call-receiving shown in FIGS. 9 and 10 show that personal station 112 is connected to base station 101B in a similar procedure if it is operated to select base station 101B at the procedure shown in FIG. 8.

According to the exemplary embodiment of the present invention, a personal station can be connected to a plurality of base stations by registering ID numbers of a plurality of base stations in base station ID number registration part 122 of personal station 121. Therefore, the communication area is not restricted to a communication area of only one base station and wide area communication becomes possible.

For example, if you register both the ID number of a base station used in your company and the ID number of a base station used in your house in your personal station 121, you can use the same personal station 121 both in your company and in your house. If you had to have a personal station in your company and another personal station in your house, you would have to keep in mind two operation procedures for two personal stations or you would have to make store abbreviated dialing numbers in both personal stations separately.

In the above exemplary embodiment, the operator is supposed to select a communicating base station in the setup procedure shown in FIG. 9.

As described above, however, it is troublesome to have to switch manually one by one when using the personal station both at the company and at the house.

It is convenient if the base stations are automatically switched. This automatic selection method is explained below.

The first method is that a timer is provided in central control part 121 of personal station 112 shown in FIG. 5, the timer is automatically switched at every fixed time and a base station which is able to connect to by wireless is previously selected. For the user, the trouble to switch is removed.

The second method is that in the case in which a personal station can not be connected to the base station having a base station ID number under setup during calling procedure of the personal station 112, the base station ID number is switched and the base station which can be connected to is automatically selected. For the user, the trouble to switch is removed.

Figure 11:
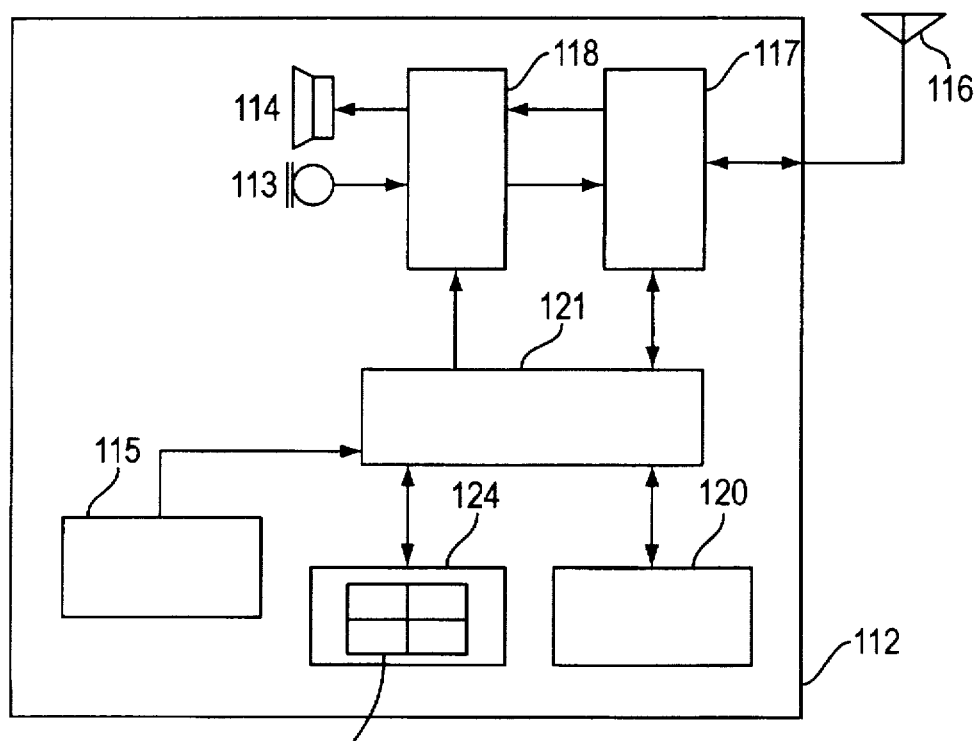
FIG. 11 is a block diagram of a variation of a personal station of a wireless telephone apparatus in accordance with an exemplary embodiment of the present invention.

The third method is to provide a memory area to store communicating time as a pair of the base station ID number in base station ID number registration part 124 and switch the base station ID numbers 101A and 101B according to a predetermined time, as shown in a block diagram of FIG. 11. For the user, the trouble to switch is removed. The configuration of personal station 112 shown in FIG. 11 is similar to that shown in FIG. 5 except base station ID number registration part 124 and the explanation is omitted.

In a method that the base station ID numbers are automatically switched, it is more convenient if display means to display which base station can be used is provided and the present performance and an information which base station the personal station is connected to are displayed by central control part 121.

This is because considering that functions of answering machine and PBX are included in the base station, a case that calling method is different depending on a base station or usable functions are different is supposed and even if it is automatically switched to the usable base station, it can not be operated unless the user can not confirm which base station is used. As display means, a device such as an LCD (liquid crystal display) can be considered.

Further, another switching method of base station ID numbers is explained below.

One is a method to automatically switch the base station ID numbers, in the case in which the public switched telephone network is in use and the user can not call from the personal station, although it is possible to wireless connect to the base station corresponding to the base station ID number now in setup, when the user wants to call.

Another method is to switch the base station ID numbers by user operation, in the case in which the public switched telephone network is in use and the user can not call, although it is possible to wireless connect to the base station corresponding to the base station ID number now in setup, when the user wants to call.

According to the present invention, personal stations can communicate each other without being restricted by a communication area of one base station, because a personal station can communicate by selecting any one of a plurality of base stations. The possibility of telephone network connection can be expanded by registering ID numbers of a plurality of base stations placed in the locations where the communication areas are overlapped.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A private cordless telephone apparatus comprising:
    a plurality of base stations connected to a public switched telephone network; and
    a personal station connected to said base stations by wireless;
    wherein said personal station comprises:
        wireless means for connecting to said base stations by wireless;
        base station ID information registration means for previously registering ID information of a plurality of base stations having a specified relation;
        base station selection indication means for indicating a selection of a base station to be called from the base stations registered in said base station ID information registration means and reading ID information of said base station to be called out of said base station ID information registration means; and
        control means for controlling said wireless means to establish wireless communication to a base station, after confirming at said base station if said base station ID information read is base station ID information registered.

2. The private cordless telephone apparatus as recited in claim 1,
    wherein said control means switches a setup for a base station to be called at every fixed time.

3. The private cordless telephone apparatus as recited in claim 1,
    wherein said control means reads ID information of the other base stations from said base station ID information registration means and controls said wireless means to establish wireless communication to a base station according to the read out information of the base station, when a wireless connection to the base station to be called is not established.

4. The private cordless telephone apparatus as recited in claim 1,
    wherein ID information of a plurality of base stations registered in said base station ID information registration means include time ID information; and
    said control means reads out ID information at every fixed time and when an ID information coincides with the time of day for an operation, said control means determines the base station registered with said time ID information to be a base station to be called.

5. The private cordless telephone apparatus as recited in claim 1, further comprising:

display means for displaying ID information concerning a base station to be called.

6. The private cordless telephone apparatus as recited in claim 1, wherein said control means reads ID information of the other base stations out of said base station ID information registration means and controls said wireless means to establish wireless communication with said base station according to the read out ID information of said base station, and wherein in the case in which when calling control is made for a base station to be called, said base station transmits a message indicating that said base station is in communication with another personal station.

7. The private cordless telephone apparatus as recited in claim 1, further comprising:

input means for inputting ID information of base station switching, wherein said control means reads ID information of the other base stations out of said base station ID information registration means, wherein if a base station switching signal is inputted from said input means, said control means controls said wireless means to establish wireless communication with said base station according to read out ID information of said base station, in the case when a switched telephone network to which said base station is connected is not able to communicate with said personal station.

8. A private cordless telephone apparatus comprising:

a plurality of base stations connected to a public switched telephone network; and a personal station connected to said base stations by wireless;

wherein said base station comprises:

first wireless means for communicating with said personal stations by wireless;

first control means for connecting with said personal station by wireless when an ID information of a base station included in a call message from said personal station is an own ID information registered in said personal station; and wherein said personal station comprises:

second wireless means for communicating by wireless with said base station;

base station ID information registration means for previously registered ID information of a plurality of base stations having a specified relation;

base station selection indication means for indicating a selection of a base station to be called and reading the ID information of said base station to be called out of said base station ID information registration means; and second control means for controlling said second wireless means to transmit information including the read ID information of the base station and establishing a wireless communication with the base station.

9. The private cordless telephone apparatus as recited in claim 8, wherein said second control means reads an ID information of a different base station out of said base station ID information registration means at every fixed time and controls said second wireless means to transmit a read information including an ID information of said base station when a call request is given from a base station.

10. The private cordless telephone apparatus as recited in claim 8, wherein said second control means reads an ID information of another base station out of said base station ID information registration means when communication by wireless with a base station to be called can not be established, and controls said second wireless means to transmit an ID information including read ID information of the base station when a call request is given from a base station.

11. The private cordless telephone apparatus as recited in claim 8, wherein time ID information are registered concerning ID information of a plurality of base stations registered in said base station ID information registration means, and wherein said second control means reads these time ID information at every fixed time and determines the base station registered with these time ID information as a base station to be called, when an ID information coincides with the time of day of an operation.

12. The private cordless telephone apparatus as recited in claim 8, wherein said personal station comprises display means for displaying an ID information concerning to a base station to be called.

13. The private cordless telephone apparatus as recited in claim 8, wherein in the case in which said second wireless means receives that when calling control is made for a base station to be called, said base station transmits a message indicating that said base station is in communication with another personal station, said second control means reads ID information of another base station out of said base station ID information registration means and controls said second wireless means to establish communication with the base station by wireless according to the read ID information of the base station.

14. The private cordless telephone apparatus as recited in claim 8, wherein said personal station comprises input means for inputting ID information of base station switching;

said second control means reads an information of another base station out of said base station ID information registration means, if a base station switching signal is inputted from input means and controls said second wireless means to transmit a read ID information including the base station ID information, when a call request is given from the base station.

15. A private cordless telephone apparatus comprising:

wireless means for wireless connecting to a base station connected to a public switched telephone network;

base station ID information registration means for previously registering ID information of a plurality of base stations having a specified relation;

control means for reading the information of a base station to be called out of said base station information registration means and controlling said wireless means to establish wireless communication with the base station according to the read out information of the base station after confirming at said base station if said base station ID information read is base station ID information registered; and wherein said control means switches a setting of a base station to be called at every fixed period.

16. A private cordless telephone apparatus comprising:
   a base station connected to a public switched telephone network; and
   a personal station connected to said base station by wireless; and wherein said base station comprises:
   first wireless means for communicating by wireless with said personal station; and
   first control means for connecting by wireless with said personal station when ID information of the base station included in a call message from said personal station is an own ID information registered in said personal station; and wherein said personal station comprises:
   second wireless means for communicating by wireless with said base station;
   base station ID information registration means for previously registering ID information of a plurality of base stations having a specified relation; and
   second control means for selecting and indicating a base station to be called from the base stations registered in said base station ID information registration means and reading an ID information of said base station to be called out of said base station ID information registration means and controlling said second wireless means to transmit ID information including the read ID information of the base station and establishing a wireless communication with the base station.

wherein said second control means controls the wireless means to transmit information to said base station, after confirming at said base station if said base station ID information read is base station ID information registered.

17. The private cordless telephone apparatus as recited in claim 1;
   wherein the information of a plurality of base stations having a specified relation to a base station ID information registration means is manually registered by a user.

* * * * *